United States Patent

Sato

[11] Patent Number: 5,537,265
[45] Date of Patent: Jul. 16, 1996

[54] ELECTRONIC STILL CAMERA WITH AUTOMATIC MODE SETTING DEVICE

[75] Inventor: Kouichi Sato, Tokyo, Japan

[73] Assignee: Asahi Kogaku Kogyo K. K., Tokyo, Japan

[21] Appl. No.: 404,025

[22] Filed: Sep. 7, 1989

[30] Foreign Application Priority Data

Sep. 13, 1988 [JP] Japan .................................. 63-229243

[51] Int. Cl.$^6$ ..................................................... H04N 5/78
[52] U.S. Cl. .......................... 360/35.1; 360/33.1; 360/61; 358/335; 358/906; 358/909.1
[58] Field of Search .................................. 360/35.1, 33.1, 360/10.1, 10.3, 61; 358/906, 312, 335, 909, 213.25, 213.26

[56] References Cited

U.S. PATENT DOCUMENTS

| | | | |
|---|---|---|---|
| 4,584,613 | 4/1986 | Amari et al. | 358/906 X |
| 4,730,222 | 3/1988 | Schauffele | 360/33.1 X |
| 4,786,986 | 11/1988 | Yamanushi et al. | 360/27 X |
| 4,959,735 | 9/1990 | Kawai | 360/33.1 X |

FOREIGN PATENT DOCUMENTS

| | | |
|---|---|---|
| 0105213 | 4/1984 | European Pat. Off. . |
| 0204626 | 12/1986 | European Pat. Off. . |
| 0287682 | 10/1988 | European Pat. Off. . |

OTHER PUBLICATIONS

French Search Report.

*Primary Examiner*—Andrew L. Sniezek
*Attorney, Agent, or Firm*—Sughrue, Mion, Zinn, Macpeak & Seas

[57] ABSTRACT

An electronic still camera having a first switch for selecting either a field record mode or a frame record mode, and a second switch for selecting either a normal mode or a high-band mode, further includes a control circuit which sets the frame record mode either when the high-band mode is selected by the second switch, or when the high-band mode is selected by the second switch and the field record mode is selected by the first switch, in the latter case optionally switching to the frame record mode only if no recording operation is performed during a predetermined time period.

7 Claims, 3 Drawing Sheets

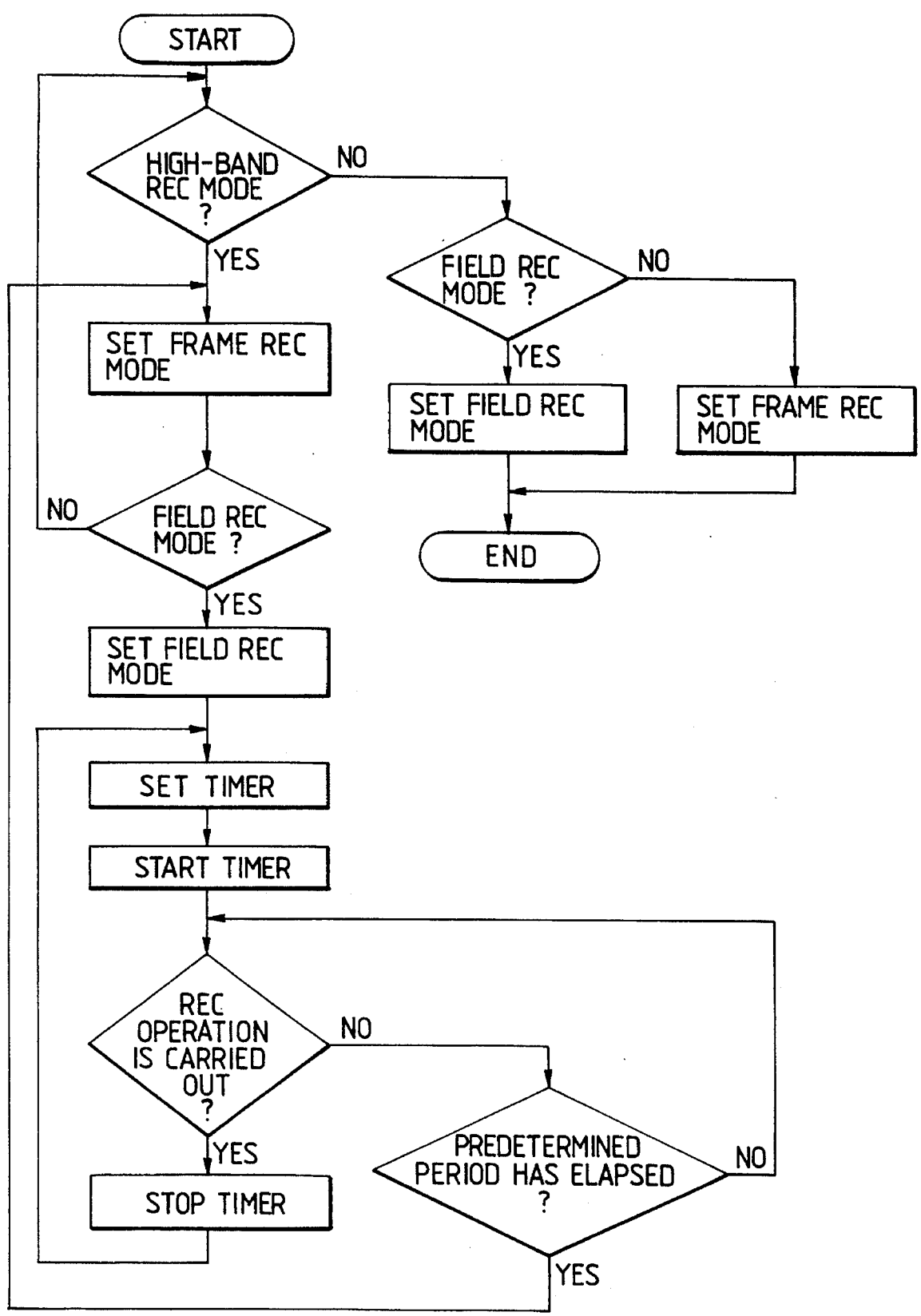

ELECTRONIC STILL CAMERA WITH AUTOMATIC MODE SETTING DEVICE

BACKGROUND OF THE INVENTION

This invention relates to an electronic still camera for recording a still picture on a magnetic disc.

A still camera operates in a field record mode or in a frame record mode. In the field record mode, for one object, a video signal for one field is recorded on the magnetic disc; and in the frame record mode, a video signal for one frame (or two fields) is recorded on the magnetic disc. When the magnetic disc makes one revolution for the time period corresponding to one field, in the field record mode one picture is recorded (one track) with one revolution; and in the frame record mode, one picture is recorded (on two tracks) with two revolutions. Accordingly, in the field record mode, the number of pictures recorded on one magnetic disc is twice as many as that recorded in the frame record mode. However, in the field record mode, the number of horizontal scanning lines is half of that in the frame record mode, and, therefore, the picture recorded in the field record mode has lower resolution than one recorded in the frame record mode.

In addition, there are provided a normal mode and a high-band mode for an electronic still camera. In the high-band mode, the frequency modulated (FM) carrier of the luminance signal has a higher and wider frequency band than in the normal mode. Hence, the horizontal resolution is higher.

The picture quality factor Q (%) with respect to the number of horizontal scanning lines and the recording (transmission) bandwidth is, for example, shown in FIG. 2.

In the conventional electronic still camera, the field/frame record mode and the normal/high-band mode can be set independently of each other. Therefore, a difficulty oftentimes occurs in that even though the high-band mode has been selected, the field record mode is not switched over to the frame record mode. Consequently, the recording operation is performed in both the high-band mode and the field record mode, thus resulting in increased horizontal resolution but decreased vertical resolution. Therefore, overall resolution is unbalanced, and, accordingly, the effect of the high-band mode is reduced.

In view of the foregoing, an object of this invention is to eliminate errors causing a picture to be recorded with poor picture quality, resulting from the field record mode not being switched to a frame record mode, even though the high-band mode has been selected.

SUMMARY OF THE INVENTION

The foregoing and other objects and features of the invention have been achieved by the provision of an electronic still camera which, according to the present invention, includes: a first switch for selecting a field record mode or a frame record mode; a second switch for selecting a normal mode or a high-band mode; a timing circuit for controlling the timing of a recording signal supplied to a magnetic head so that a video signal of one field or one frame is recorded, according to the mode selected by the first switch; a modulator circuit for setting a carrier, which is frequency-modulated (FM) with a video signal, according to the mode selected by the second switch; and a control circuit which sets the frame record mode regardless of the mode selected by the first switch when the high-band mode is selected by the second switch.

If the field record mode has been selected by the first switch, and subsequently the high-band mode is selected by the second switch, the control circuit forcibly switches the field record mode over to the frame record mode immediately, or in a predetermined time period.

Hence, according to the present invention, an image with high resolution and picture quality is formed even though the mode (i.e., the field record mode) selected by the first switch becomes inappropriate, after the second switch selects the high-band mode and subsequent resetting of the inappropriate mode to the proper mode has been neglected.

BRIEF DESCRIPTION OF THE DRAWINGS

The above and other objects, features, and advantages of this invention will become more apparent from the following detailed description when read in conjunction with the accompanying drawings in which:

FIG. 4 is a flow chart describing the operation of a second embodiment of the electronic still camera according to the present invention.

DETAILED DESCRIPTION OF THE PREFERRED EMBODIMENTS

Figure 3:
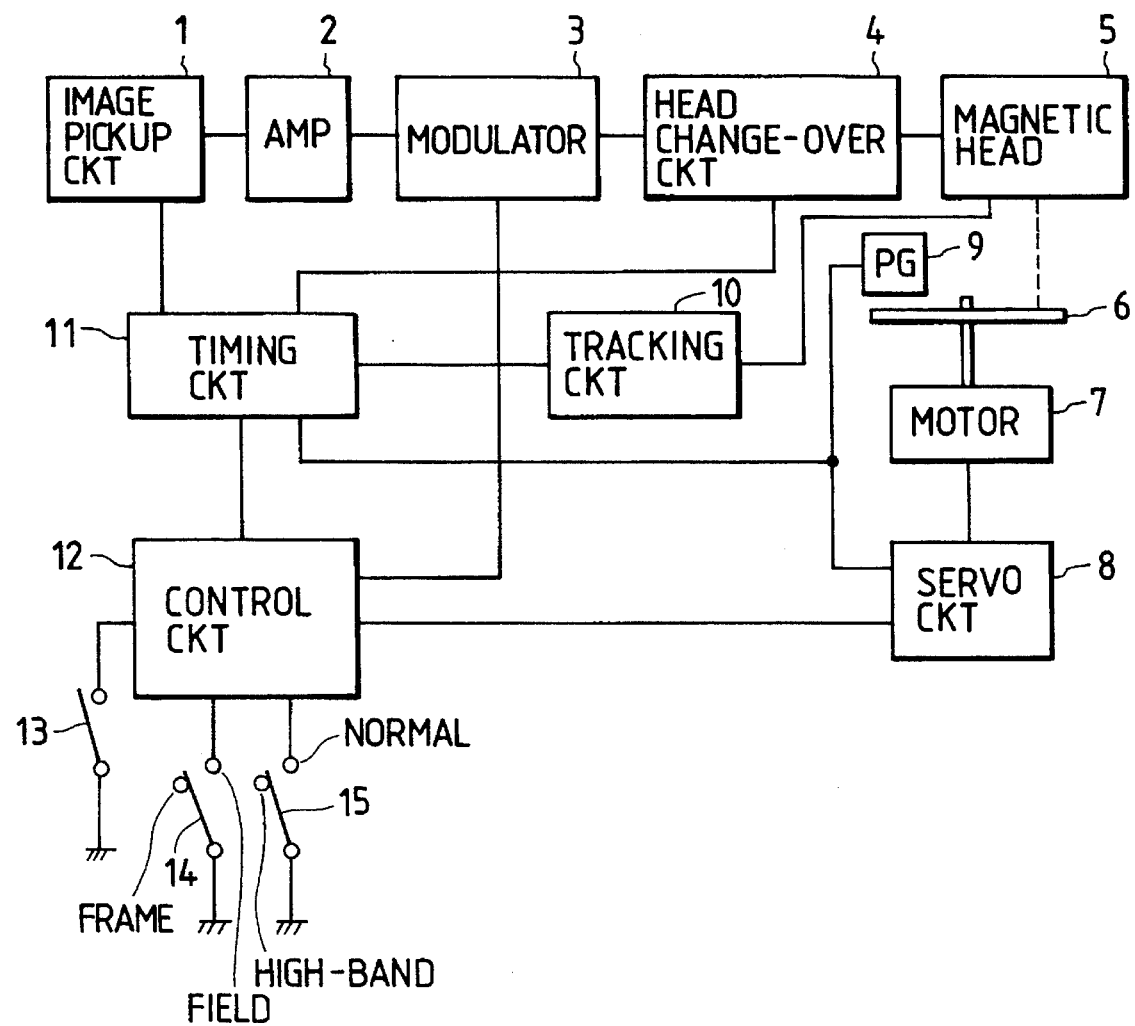
FIG. 3 is a block diagram showing the arrangement of the electronic still camera according to the present invention.

FIG. 3 is a block diagram showing the arrangement of an electronic still camera according to the present invention in which an image pickup circuit 1 including a photo-electric conversion element, such as a charge-coupled device (CCD), converts the optical image of an object (not shown) into an electrical signal which is inputted to amplifier circuit 2. The electrical signal is amplified by amplifier circuit 2, and inputted to modulator circuit 3. In modulator circuit 3, a carrier having a predetermined frequency is frequency-modulated with the output video signal of amplifier circuit 2, and inputted to head change-over circuit 4. Head change-over circuit 4 selects one of two magnetic heads (only one magnetic head is shown for convenience in description), and inputs the signal to the magnetic head thus selected.

Further, in FIG. 3, a magnetic disc 6 is rotated by an electric motor 7, and a servo circuit 8 compares a pulse signal which is outputted by a PG coil corresponding to the position rotation of the magnetic disc 6 with a predetermined reference signal, thereby to control the rotation of the motor 7 according to the difference between the pulse signal and the predetermined reference signal. Tracking circuit 10 tracks the magnetic head 5, and a timing circuit 11 provides a variety of timing signals to the above-described circuits. A control circuit 12 comprising, for example, a microcomputer, controls the above-described circuits in response to instruction signals provided through switches 13, 14, and 15.

The frame record mode is selected by turning off switch 14, and the field record mode is selected by turning on switch 14. The high-band mode is selected by turning off switch 15, and the normal mode is selected by turning on switch 15.

When switch 13 is turned on, control circuit 12 controls, via timing circuit 11, the image pickup circuit 1. In this operation, the image of the object is sent to image pickup circuit 1, which outputs the video signal thereof. The outputted video signal is amplified by the amplifier circuit 2, and inputted to modulator circuit 3. In modulator circuit 3, the carrier having a predetermined frequency is modulated with the video signal so as to produce an output signal. In response to a control signal from control circuit 12, the carrier of the luminance signal is set to a low and narrow frequency band (for example, from 6 MHz to 7.5 MHz) in the case of the normal mode being selected, and is set to a high and wide frequency band (for example, from 7.7 MHz to 9.7 MHz) in the case of the high-band mode being selected. The output of modulator circuit 3 is inputted through the head change-over switch 4 to magnetic head 5, so that the output is recorded on predetermined tracks on magnetic disc 6 which is being rotated by motor 7 at the speed of one revolution per field (i.e., 3600 rpm in the National Television System Committee (NTSC) system).

When the field record mode has been selected, the video signal corresponding to one field is read-out of image pickup circuit 1, and recorded on one of the coaxial tracks on magnetic disc 6. Alternatively, when the frame record mode has been selected, the video signal corresponding to one frame is read-out from image pickup circuit 1. The first magnetic head 5 selected records the video signal of one field on one track, whereupon the head change-over switch 4 is activated to select the other magnetic head, so that the video signal of the next field is recorded on the next track by the other magnetic head thus selected.

Figure 1:
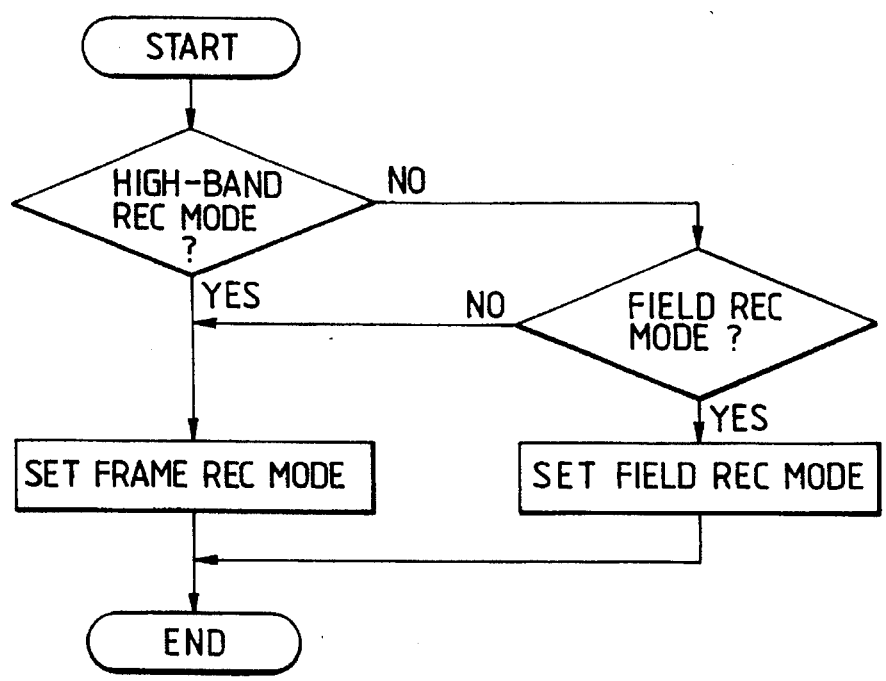
FIG. 1 is a flow chart describing the operation of a first embodiment of an electronic still camera according to the present invention.
Figure 2:
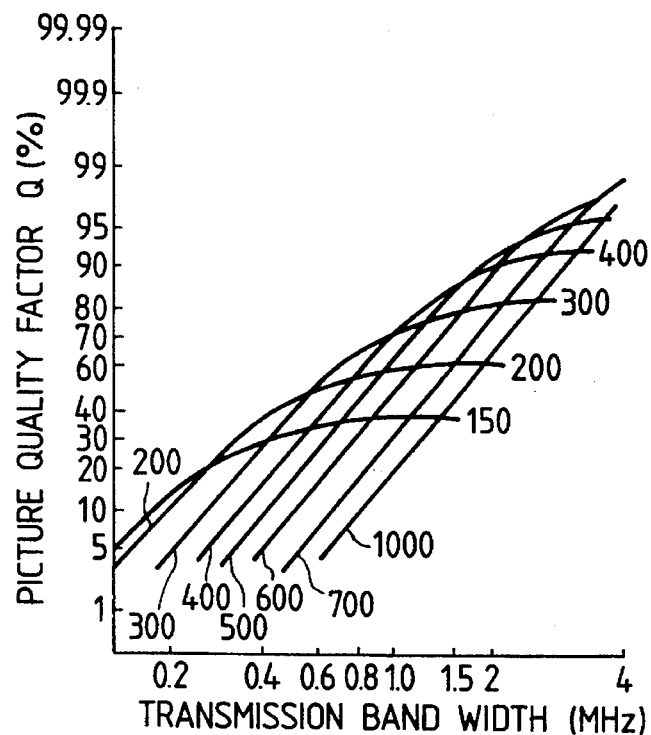
FIG. 2 is a characteristic diagram indicating the number of horizontal scanning lines and transmission bandwidths in relation to picture quality factors.

FIG. 1 is a flow chart describing the operation of control circuit 12 reading switches 14 and 15 and setting the corresponding modes. In operation, it is determined first whether or not the high-band mode is specified (i.e., whether or not switch 15 is turned off). When it is determined that the high-band mode is selected (i.e., switch 15 is turned off), control circuit 12 sets the frame record mode regardless of the "on/off" state of switch 14. Consequently, even if switch 14 is turned on, control circuit 12 forcibly turns off switch 14.

When the high-band mode is not selected (i.e., switch 15 is turned on), it is determined whether or not the field record mode has been selected (i.e., whether or not switch 14 is turned on). When it is determined that the field record mode has been selected, then the field record mode is set. If it is determined that the field record mode has not been selected, then the frame record mode is set.

In the above-described embodiment, when the high-band mode is selected, the frame record mode is set automatically. Only when the normal mode has been selected is the field record mode, or the frame record mode, set according to the operation of switch 14.

FIG. 4 is a flow chart describing the mode setting operation of a second embodiment of the electronic still camera according to the present invention.

In the second embodiment, the operational status of switch 15 first is detected. When switch 15 is in the "on" state (i.e., the normal mode is selected), the operational status of switch 14 is read, so that the field record mode, or the frame record mode, is set according to the "on/off" operational state of switch 14.

When switch 15 is turned off (i.e., the high-band mode is selected), control circuit 12 sets the frame record mode once, and reads the state of switch 14. When switch 14 is turned off (i.e., the frame record mode is selected), control circuit 12 waits until switch 14 is operated, because the set mode (i.e., the frame record mode) has been selected. If switch 13 is turned on during this stand-by period, the recording operation is performed.

When switch 14 is turned on (i.e., the field record mode is selected), control circuit 12 changes the set mode over to the field record mode, sets the timer built therein, and then starts the timer. During the operation of the timer, the timer is monitored regardless of whether or not the recording operation is being performed (i.e., whether or not switch 13 is turned on). The monitoring operation continues until the timer detects the lapse of a predetermined time period. If no recording operation is performed during the predetermined time period, the field record mode is switched over again to the frame record mode.

When the recording operation is performed before the predetermined time period lapses, the timer is stopped, reset, and then started again.

In the above-described embodiment, when the normal mode is selected, the field record mode or the frame record mode is set according to the "on/off" state of switch 14. When the high-band mode is selected, the mode is set as described hereinbelow. When switch 14 selects the frame record mode, the frame record mode is set as it is. When switch 14 selects the field record mode, the field record mode is set for the predetermined time period. If no recording operation is performed during the predetermined time period, then the frame record mode is set regardless of the "on/off" state of switch 14. If a recording operation is performed during the predetermined time period, then the field record mode is set for the predetermined time period again. This operation is performed repeatedly.

Hence, if performing a recording operation in both the high-band mode and in the field record mode is required, then the recording operation can be conducted by selecting both those modes, and by starting the recording operation during the predetermined time period.

As described above, the electronic still camera according to the present invention is designed so that when the high-band mode is selected, the frame record mode automatically is set, immediately or in a predetermined time period. Therefore, the electronic still camera is improved in operability, and images having low picture quality and unbalanced resolution will not be recorded unintentionally.

While certain preferred embodiments have been shown and described, many changes and modifications within the spirit of the invention will be apparent to those of working skill in this technical field. Thus, the scope of the invention should be considered as limited only by the appended claims.

What is claimed is:

1. An electronic still camera, comprising:

a first switch for selecting one of a field record mode and a frame record mode;

a second switch for selecting one of a normal mode and a high-band mode;

a timing circuit for controlling a timing of a recording signal supplied to a magnetic head so that a video signal, represented by said recording signal, of one of one field and one frame is recorded, according to a mode selected by said first switch;

a modulator circuit for setting, according to a mode selected by said second switch, a carrier which is frequency-modulated with said video signal; and a control circuit, including means for detecting whether said high-band mode has been selected and means for detecting whether a recording operation has been performed, which sets the frame record mode when said high-band mode is selected by said second switch, wherein with said high-band mode selected by said second switch after the field record mode has been selected by said first switch, and no recording operation being performed during a predetermined time period, said control circuit automatically sets said frame record mode for a subsequent recording operation.

2. An electronic still camera, comprising:

a first switch for selecting one of a field record mode and a frame record mode;

a second switch for selecting one of a normal mode and a high-band mode;

a timing circuit for controlling the timing of a recording signal supplied to a magnetic head so that a video signal, represented by said recording signal, of one of one field and one frame is recorded, according to said mode selected by said first switch;

a modulator circuit for setting, according to said mode selected by said second switch, a carrier which is frequency-modulated with said video signal; and a control circuit, including means for detecting whether said high-band mode has been selected and means for detecting whether a recording operation has been performed, which sets said field record mode with said high-band mode selected by said second switch and said field record mode having been selected by said first switch, wherein with no recording operation being performed during a predetermined time period, said control circuit automatically sets the frame record mode for a subsequent recording operation.

3. An electronic still camera, comprising:

a first switch having a first position for selecting a field record mode and a second position for selecting a frame record mode;

a second switch having a first position for selecting a normal mode and a second position for selecting a high-band mode; and control means responsive to said first switch being in its second position for setting said camera to operate in said frame record mode and responsive to said second switch being in said second position for setting said camera to operate in said frame record mode regardless of the position of said first switch, wherein said control means sets said camera to operate in said frame record mode upon said second switch being switched to said second position, said control means further including means responsive to the subsequent switching of said first switch to said first position for setting said camera to operate in said field record mode for only a predetermined time period, after which said control means sets said camera to operate in said frame record mode.

4. An electronic still camera, comprising:

a first switch having a first position for selecting a field record mode and a second position for selecting a frame record mode;

a second switch having a first position for selecting a normal mode and a second position for selecting a high-band mode; and control means responsive to said first switch being in its second position for setting said camera to operate in said frame record mode and responsive to said second switch being in said second position for setting said camera to operate in said frame record mode regardless of the position of said first switch, wherein said control means sets said camera to operate in said frame record mode upon detecting said first switch in said first position and said second switch in said second position only if a predetermined time period elapses with no recording operation being performed.

5. An electronic still camera, comprising:

a first switch having a first position for selecting a field record mode and a second position for selecting a frame record mode;

a second switch having a first position for selecting a normal mode and a second position for selecting a high-band mode; and control means responsive to said first switch being in its second position for setting said camera to operate in said frame record mode and responsive to said second switch being in said second position for setting said camera to operate in said frame record mode regardless of the position of said first switch; and means for measuring a predetermined time period, wherein said control means includes means for determining a position of said first switch and a position of said second switch and means for determining whether a recording operation has been performed within said predetermined time period.

6. An electronic still camera, comprising:

a first switch having a first position for selecting a field record mode and a second position for selecting a frame record mode;

a second switch having a first position for selecting a normal mode and a second position for selecting a high-band mode; and control means responsive to said first switch being in its second position for setting said camera to operate in said frame record mode and responsive to said second switch being in said second position for setting said camera to operate in said frame record mode regardless of the position of said first switch, wherein said control means includes means for setting said camera to operate in said frame record mode upon said second switch being switched to said second position, and means for setting said camera to operate in said field record mode for a predetermined time period after subsequent switching of said first switch to said first position.

7. An electronic still camera according to claim 6, wherein said setting means sets said camera to operate in said frame record mode after said predetermined time period has lapsed.

* * * * *